Dec. 8, 1925.
T. F. V. McGLYNN
1,564,700
NUT LOCK
Filed March 12, 1924
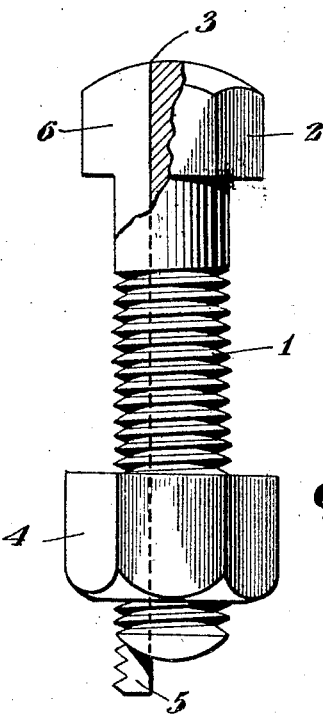
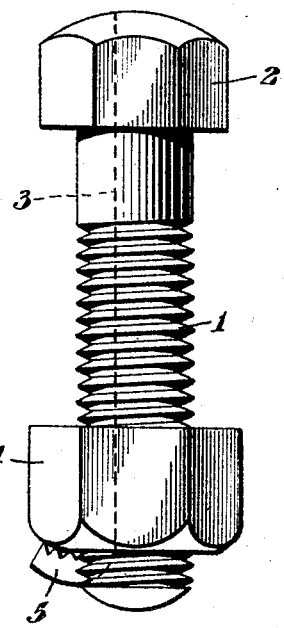
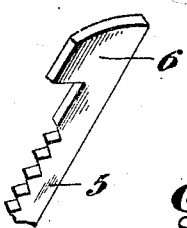
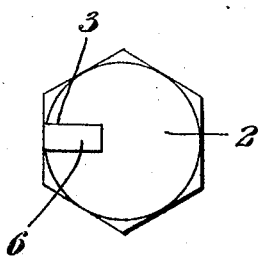
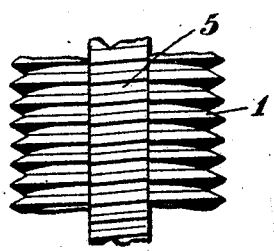
Inventor
Thomas F. V. McGlynn.
By his Attorneys
Townsend & Decker.

Patented Dec. 8, 1925.

1,564,700

UNITED STATES PATENT OFFICE.

THOMAS FRANCIS VINCENT McGLYNN, OF PHILADELPHIA, PENNSYLVANIA.

NUT LOCK.

Application filed March 12, 1924. Serial No. 698,625.

*To all whom it may concern:*

Be it known that I, THOMAS FRANCIS VINCENT McGLYNN, a citizen of the United States, and a resident of Philadelphia, in the county of Philadelphia and State of Pennsylvania, have invented certain new and useful Improvements in Nut Locks, of which the following is a specification.

My invention relates to nut locks of the type having a removable threaded key, the end of which is adapted to be bent up into tight engagement with the nut to lock the nut in any desired position on its bolt.

The object of the invention is to provide a simple, cheap and effective nut lock of the type specified.

Other objects and advantages of the invention will appear from the accompanying description, the invention consisting in the novel nut lock hereinafter more particularly described and then specified in the claims.

In the accompanying drawing showing a practical embodiment of the invention:

Fig. 1 is a side elevation (partly in section) of a bolt and key made in accordance with my invention and showing a nut screwed on said bolt.

Fig. 2 is a similar view showing the end of the key bent over into engagement with the nut and in locking position therewith.

Fig. 3 is a top plan view of the device shown in Fig. 1.

Fig. 4 is an enlarged fragmentary side elevation of a portion of the shank of the bolt and of the key.

Fig. 5 is a perspective view of the upper end of the key.

Referring in detail to the several figures of the drawing:

1 indicates the shank of a bolt having a head 2 which may be hexagonal in shape or of any other shape. The bolt is provided with a slot 3 therein which is preferably squared and which is rolled in the original bar from which the bolt is made. Said slot extends longitudinally through said bolt from end to end as well as through the head of said bolt. Inasmuch as the slot is rolled in the original bar as stated, a cutting of the slot in the bolt is not necessary thereby obviating the possibility of weakening the bolt or of mutilating the threads on the shank thereof. 4 indicates a nut which is interiorly screw-threaded and which is adapted to be screwed on the threaded shank 1.

The shank of the key made in accordance with my invention is indicated at 5 while 6 indicates the head of said key. The shank 5 is threaded on one side as shown, the threads being pitched at slight variance with the pitch of the threads of the nut and bolt. Said key is adapted to interfit with and to be removably inserted in the slot 3 and the lower end of the shank of said key is adapted to extend or project beyond the lower end of the bolt as shown in Fig. 1. The key preferably is made of stronger metal than that of the bolt such for instance, steel, whereby it acts as a strengthening member for said bolt throughout its length. It may also be easily inserted in the slot of the bolt or removed therefrom as it extends the full length of the bolt. Furthermore, it may be made in standard sizes as are the nuts, whereby it may be replaced at will. The key is supported by the bolt and the head 6 thereof conforms in shape to that portion of the head 2 of the bolt adjacent the slot.

Inasmuch as the threaded portion of the shank of the key is pitched at slight variance with that of the nut and bolt as heretofore described and as shown in Fig. 4, when the nut is screwed on the bolt the threads of the nut and bolt are drawn in tight mesh thereby preventing any lost motion and making a firm set without injury to the threads of either the nut or the bolt. This slight variance in pitch also tends to retain or hold the nut in any given or desired position on the bolt.

After the key has been inserted or placed within the slot in the bolt with the threaded side of the key extending outwardly whereby the threads will co-operate with those of the bolt, the nut may be screwed on to the bolt and on to the threaded portion of the shank of the key to any desired position, as shown in Fig. 1. When the nut has reached the desired position the lower projecting end of the shank 5 of the key is bent over into tight engagement with a side of the nut whereby the threads of the shank of the key will be jammed against the threads of the nut, thus producing a positive lock of the nut on the bolt which cannot be loosened by vibration.

What I claim as my invention is:—

1. A nut lock comprising a threaded bolt having a slot extending longitudinally therethrough from end to end and a key adapted to interfit with and be inserted within said slot and having a threaded portion the threads of which are pitched at a slight variance with the pitch of the threads of the bolt, said bolt and key being adapted to have a nut screwed thereon.

2. A nut lock comprising a threaded bolt having a peripheral slot therein extending longitudinally therethrough and a removable key adapted to be inserted in and to snugly interfit with said slot and comprising a metal stronger than the metal of said bolt, said key having a portion thereof threaded, said threaded portion corresponding to the contour of the threaded portion of said bolt when in position in said slot, adapting said bolt and key to have a nut screwed thereon.

3. A nut lock comprising a threaded bolt having a slot therein extending longitudinally from end to end, a removable key adapted to interfit with said slot and having a portion thereof threaded with the threads thereof corresponding in direction with the threads of said bolt when said key is fitted in said slot but pitched at variance with the pitch of the threads on the bolt, and a nut screwed on said bolt and key, said key having an end normally extending beyond the end of said bolt and being adapted to be bent over on said nut whereby the threads of the key will be jammed against the threads of the nut to lock the nut against movement.

4. A nut lock comprising a bolt having a threaded shank and a head with a slot extending longitudinally through said shank and head from end to end of said bolt, a key adapted to be inserted in and snugly interfit with said slot and provided with a screw-threaded side co-operating with the threads on said shank, the body of said key being proportioned to complete the general contour of said bolt when inserted in said slot, and a head on said key conforming in shape to the shape of the head of said bolt adjacent said slot, said shank and key being adapted to have a nut engage the threaded portion of both said shank and key when screwed thereon..

Signed at Philadelphia, in the county of Philadelphia and State of Pennsylvania, this 8th day of March A. D. 1924.

THOMAS FRANCIS VINCENT McGLYNN.